(12) United States Patent
Kobayashi et al.

(10) Patent No.: US 8,794,431 B2
(45) Date of Patent: Aug. 5, 2014

(54) CONVEYOR SYSTEM

(75) Inventors: Takuo Kobayashi, Tochigi (JP); Izuru Hori, Tochigi (JP); Shin Yoshida, Tochigi (JP); Kenichi Fukami, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 380 days.

(21) Appl. No.: 13/213,235

(22) Filed: Aug. 19, 2011

(65) Prior Publication Data

US 2012/0055762 A1 Mar. 8, 2012

(30) Foreign Application Priority Data

Sep. 2, 2010 (JP) ................................. 2010-197015

(51) Int. Cl.
*B65G 17/42* (2006.01)

(52) U.S. Cl.
USPC .................. 198/867.01; 198/817; 198/867.08; 198/867.14; 198/867.15

(58) Field of Classification Search
USPC ............. 198/867.01, 867.08, 867.11, 867.14, 198/867.15, 795, 817, 803.14
See application file for complete search history.

(56) References Cited

U.S. PATENT DOCUMENTS

| | | | | |
|---|---|---|---|---|
| 3,032,170 A | * | 5/1962 | Elkington | 198/803.14 |
| 3,052,340 A | * | 9/1962 | Lyons et al. | 198/867.01 |
| 5,301,796 A | * | 4/1994 | Rautio | 198/817 |
| 6,686,566 B1 | * | 2/2004 | Corey | 198/817 |
| 2009/0184097 A1 | | 7/2009 | Klaiber et al. | |
| 2009/0212033 A1 | | 8/2009 | Beck et al. | |

FOREIGN PATENT DOCUMENTS

| | | |
|---|---|---|
| CN | 201316868 Y | 9/2009 |
| JP | 51-128869 U | 10/1976 |
| JP | 61-289988 A | 12/1986 |
| JP | 62-77688 | 5/1987 |
| JP | 63-224893 | 9/1988 |
| JP | 1-159992 U | 11/1989 |
| JP | 3-70881 U | 7/1991 |
| WO | 03/016004 A1 | 2/2003 |

OTHER PUBLICATIONS

Japanese Office Action dated Dec. 10, 2013, 4 pages.
Chinese Office Action dated Oct. 24, 2013, 6 pages.
Japanese Office Action dated May 13, 2014, 3 pp.

\* cited by examiner

*Primary Examiner* — Leslie A Nicholson, III
(74) *Attorney, Agent, or Firm* — Rankin, Hill & Clark LLP

(57) ABSTRACT

A conveyor system is provided with a plurality of support members which are erected and spaced apart from each other, a plurality of holding units on which the plurality of support members are held, and a drive unit that moves the holding units in a conveying direction. A supporting plane on which a workpiece is supported and conveyed is formed by distal end portions of the support members. The support members are movable in parallel with respect to the supporting plane.

4 Claims, 5 Drawing Sheets

CONVEYOR SYSTEM

BACKGROUND OF THE INVENTION

1. Field of the Invention

The present invention relates to a conveyor system for conveying a workpiece while supporting a lower surface of the workpiece during processing, and more particularly to a conveyor system including a plurality of support members which are erected upwards and spaced apart from each other.

2. Related Art

When cutting, heat treating or surface treating a workpiece by laser beam, water jet, plasma arc discharge or gas burner, in the event that the workpiece is directly placed on a table, there may be a problem that a surface of the table is damaged by the laser beam which has passed through the workpiece. In addition, there may be a problem that a portion of the workpiece which should not be processed or a laser beam emitting apparatus is damaged by the laser beam which has passed through the workpiece and reflected on the surface of the table. Additionally, there occurs a situation in which an assist gas cannot be discharged with good efficiency and the processing of the workpiece cannot be performed well.

As a countermeasure against these problems, there is known a table in which a plurality of support members are erected upwards while being spaced apart from each other and workpiece is supported by distal ends of the support members. In the table, a risk that a laser beam passes through the workpiece and is irradiated on to the table is extremely reduced, whereby a risk of damaging the table is reduced correspondingly. However, when a working position and a supporting position coincide to each other, the laser beam that has passed through the workpiece is still irradiated on to the distal end portions of the support members to thereby damage the support members. In addition, the workpiece cannot be processed well, and the problems cannot be solved completely.

Then, there is reported a configuration in which a plurality of pins are disposed into a matrix on a pedestal and the support pins which are disposed below a cutting position of a workpiece are selectively raised and lowered (refer to JP-U-62-077688, for example). The support pins are provided on a belt conveyor so as to be raised and lowered by selectively energizing electromagnets.

In the conventional pedestal, however, since the support pins are provided on the belt conveyor so as to be raised and lowered by selectively energizing the electromagnets, the raising and lowering of the support pins has to be carried out by moving the belt conveyor at a very slow speed or temporarily stopping the belt conveyor, thereby making it difficult to carry out the continuous processing or cutting of the workpiece. In addition, in the pedestal, the support pins can be moved only in the vertical direction, and therefore, a degree of freedom in disposition of the support pins is largely limited.

SUMMARY OF THE INVENTION

One or more embodiments of the invention provide a conveyor system in which support members are movable in parallel with respect to a workpiece supporting surface so that the support members are not disposed in a position on to which a laser beam is irradiated, and which can convey the workpiece without damaging the support members even when the workpiece is continuously processed.

In accordance with one or more embodiments of the invention, a conveyor system may include: a plurality of support members 5 which are erected and spaced apart from each other; a plurality of holding units 4 on which the plurality of support members 5 are held; and a drive unit 3 configured to move the holding units 4 in a conveying direction. A supporting plane on which a workpiece is supported may be formed by distal end portions of the support members 5. The support members 5 may be respectively arranged to be movable in parallel with respect to the supporting plane. The workpiece may be conveyed while being supported on the supporting plane.

Other aspects and advantages of the invention will be apparent from the following description and the appended claims.

DETAILED DESCRIPTION OF EXEMPLARY EMBODIMENT

Figure 1:
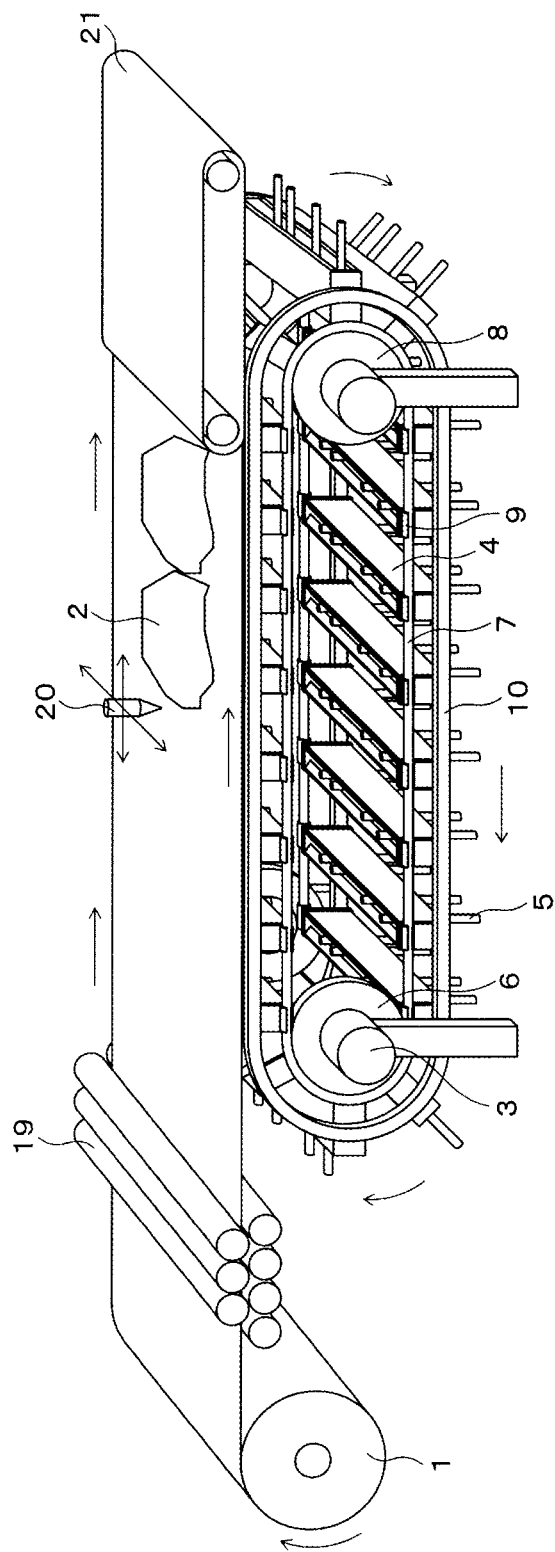
FIG. 1 is a perspective view showing a laser cutting system which employs a conveyor system of an exemplary embodiment.

The description will be given hereinbelow on the basis of an exemplary embodiment with reference to the drawings. Note that the drawings are to be seen in the direction in which reference numerals look properly. Further, the exemplary embodiment is not intended to limit the invention or embodiments but to serve as exemplification thereof, and all features or combinations thereof described in the exemplary embodiment are not always essential to the invention or the embodiments.

1. Configuration of Conveyor System

FIG. 1 is a perspective view showing a laser cutting system which employs the conveyor system of the exemplary embodiment. In the exemplary embodiment, as shown in FIG. 1, in a step of cutting plate-like members 2 of a predetermined shape out of a sheet steel unwound from a coil 1 of long sheet steel by laser irradiated on to the sheet steel, the sheet steel unwound from the coil 1 and the plate-like members 2 cut out of the sheet steel are conveyed from left to right while supporting them on the conveyer system. The conveyor system of the exemplary embodiment includes a drive unit 3, a plurality of holding units 4 which are conveyed in the conveying direction by the drive unit 3 and a plurality of support members 5 which are held by the holding units 4.

As the drive unit 3, any type of drive unit can be adopted, provided that the driving unit adopted can move the holding units in the conveying direction of workpiece. Specifically, there is raised a drive motor. A driving force generated by the drive unit 3 is transmitted to the holding units 4 via drive pulleys 6 and drive wires 7. The drive wires 7 are wound individually round two sets of drive pulleys 6 and driven pulleys 8 in an endless fashion so as to extend therebetween so that respective upper straight-line portions of the drive wires 7 become parallel to the conveying direction of workpiece. Then, as shown in FIGS. 1 and 2, the plurality of holding units are provided at predetermined intervals along the full circumference of the drive wires 7 so as to extend between the two drive wires 7 which are wound round the drive pulleys 6 and the driven pulleys 8.

Figure 3A:
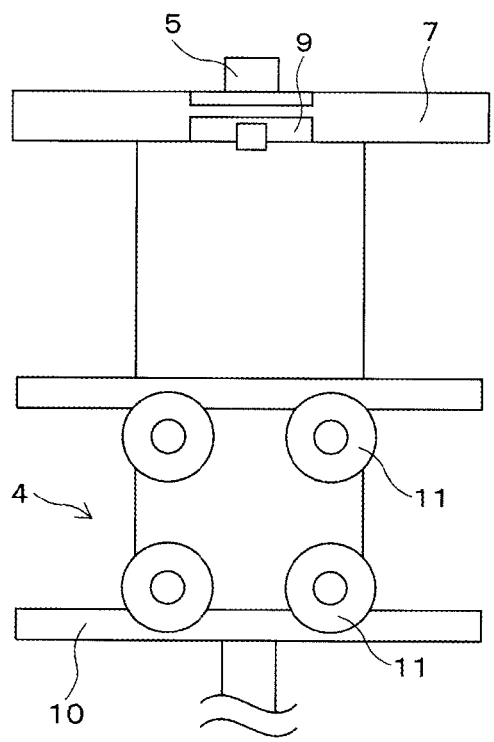
FIG. 3(a) is a front view of a side surface portion of the holding unit of the conveyor system.
Figure 3B:
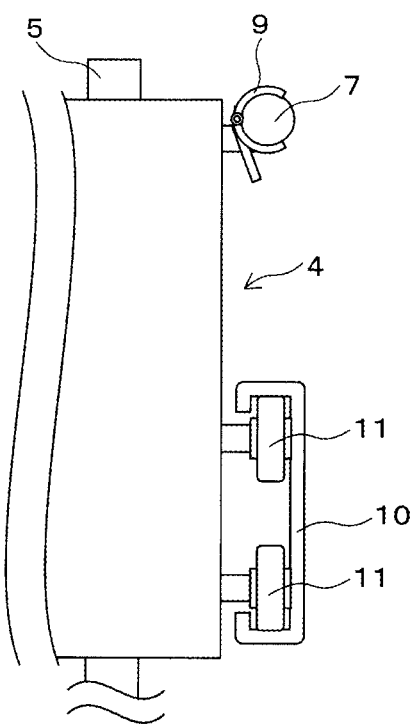
FIG. 3(b) is a side view of the side surface portion.

As shown in FIG. 3(a) and FIG. 3(b), the holding unit 4 is fixed to the drive wire 7 by a gripping mechanism 9 and is disposed so as to extend in a direction which intersects the conveying direction. In addition, in the conveyor system of the exemplary embodiment, the plurality of support members 5 are provided in one holding unit 4 so as to be disposed at predetermined intervals in a direction which intersects the conveying direction and to extend in a direction which intersects the two drive wires 7. According to this configuration, the plurality of holding units 4 move circumferentially along oval tracks of the drive wires 7 by the drive force transmitted to the drive wires 7, and a supporting plane of the workpiece is formed by respective distal end portions of the support members 5 at the upper straight-line portions of the drive wires 7.

In the exemplary embodiment, the gripping of the drive wire 7 by the gripping mechanism 9 can manually or automatically be released and resumed before and after or during the conveyance of work, whereby the intervals between the plurality of support members 5 in the conveying direction of workpiece can be adjusted.

Figure 2:
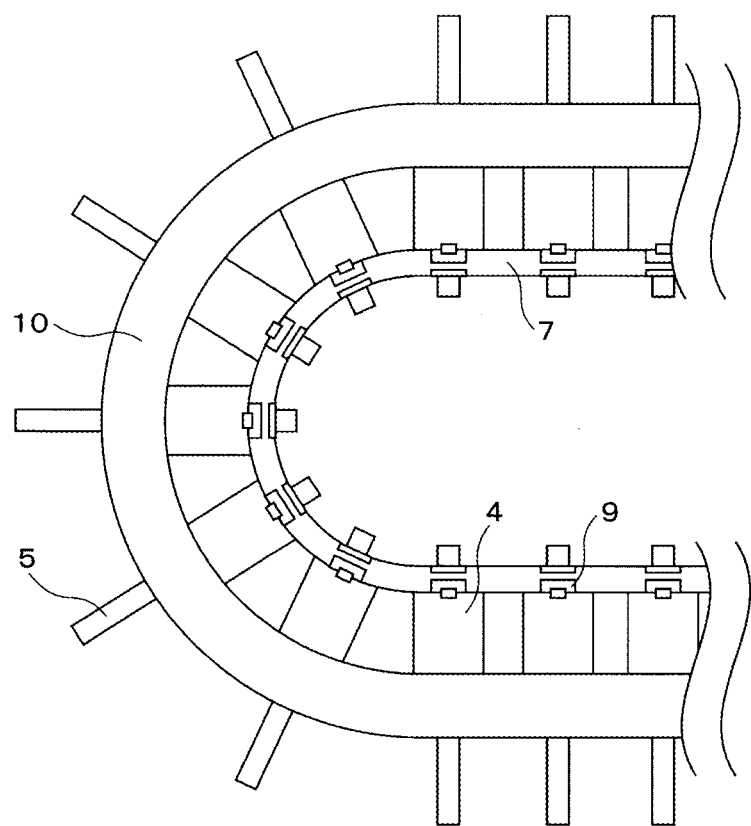
FIG. 2 is a side view showing a part of support members and holding units of the conveyor system.

In addition, in the conveyor system of the exemplary embodiment, as shown in FIGS. 1 and 2, a guide rail 10 is provided on an outer side of the oval track on which the drive wire 7 is disposed. Then, as shown in FIG. 3 (a) and FIG. 3 (b), four roller bearings 11 are preferably provided on a side portion of the holding unit 4 so as to be individually brought into engagement with an inner surface of the guide rail 10. According to this configuration, the roller bearings 11 which in engagement with the guide rail 10 slide along the guide rail 10 in association with the rotation of the drive wire 7, whereby the circumferential movement of the holding unit 4 along the oval track of the drive wire 7 is guided stably.

Figure 4:
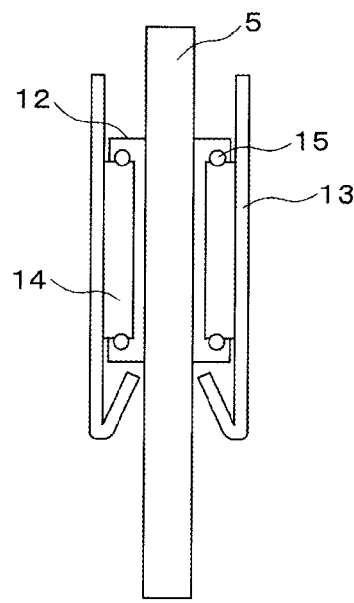
FIG. 4 is a sectional view of the holding unit of the conveyor system.
Figure 5:
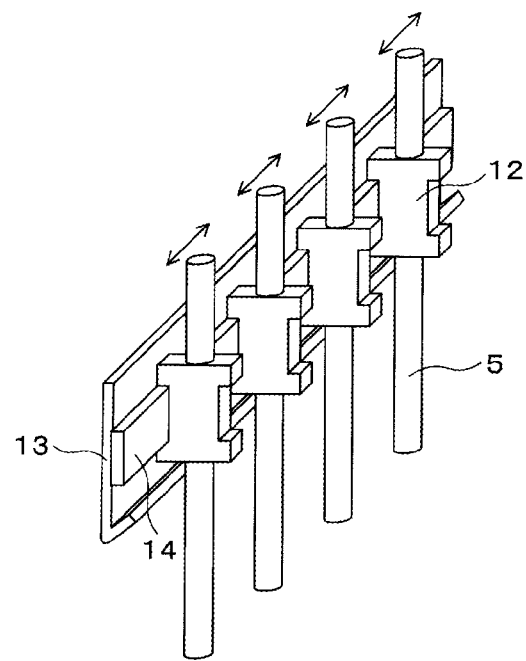
FIG. 5 is a perspective view showing an interior of the holding unit of the conveyor system.
Figure 6:
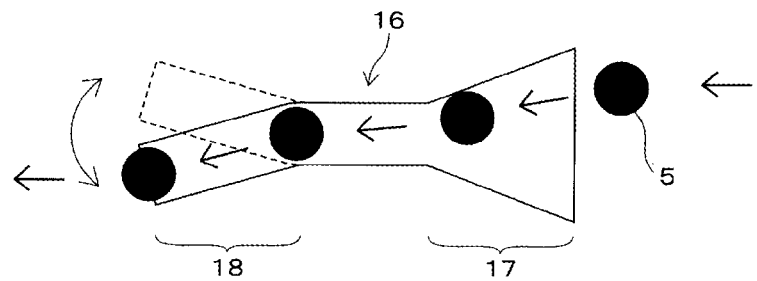
FIG. 6 is a top view showing a guide unit of the conveyor system.

Further, in the exemplary embodiment, as shown in FIG. 4, the support member 5 is fixed to a pin flange 12, and the pin flange 12 is brought into engagement with guide rails 14 provided on inner sides of shaft plates 13 of the holding unit 4 via bearings 15. According to this configuration, the support member 5 is guided to a predetermined position by a guide unit 16, which will be described later, whereby the flange pin 12 can slide preferably on the guide rails 14. Thus, as shown in FIG. 5, the support members 5 can move in a direction which intersects the conveying direction. Note that in this exemplary embodiment, the sliding of the pin flange 12 on the guide rails 14 via the bearings 15 has such a rolling resistance that stops the sliding of the pin flange 12 when the guiding of the support member 5 by the guide unit 16 is completed.

In addition, in the conveyor system of the exemplary embodiment, guide units 16 are provided which can guide the support members 5 to a predetermined position in the direction which intersects the conveying direction by guiding some of the support members 5 which are caused to move circumferentially by the drive unit 3. The guide units 16 of the exemplary embodiment each have a fixed guide portion 17 having an opening which can accommodate even the support member 5 which moves to a maximum extent in the direction which intersects the conveying direction and a swinging guide portion 18 for guiding the support members 5 which are taken into the guide unit 16 from the fixed guide portion 17 to the predetermined position in the direction which intersects the conveying direction.

In this guide unit 16, firstly, some of the support members 5 which are caused to move circumferentially by the drive unit 3 are taken into the guide unit 16 from the fixed guide portion 17 and are then guided to the swinging guide portion 18 along an inner surface thereof. Following this, an angle at a downstream end of the swinging guide portion 18 is controlled by controlling to drive a servo motor by a computer, for example. In this arrangement, when the support members 5 so guided are caused to continue to move circumferentially further by the drive unit 3, the support members 5 are caused to pass through the swinging guide portion 18 so as to be guided to the predetermined position in the direction which intersects the conveying direction.

Figure 7:
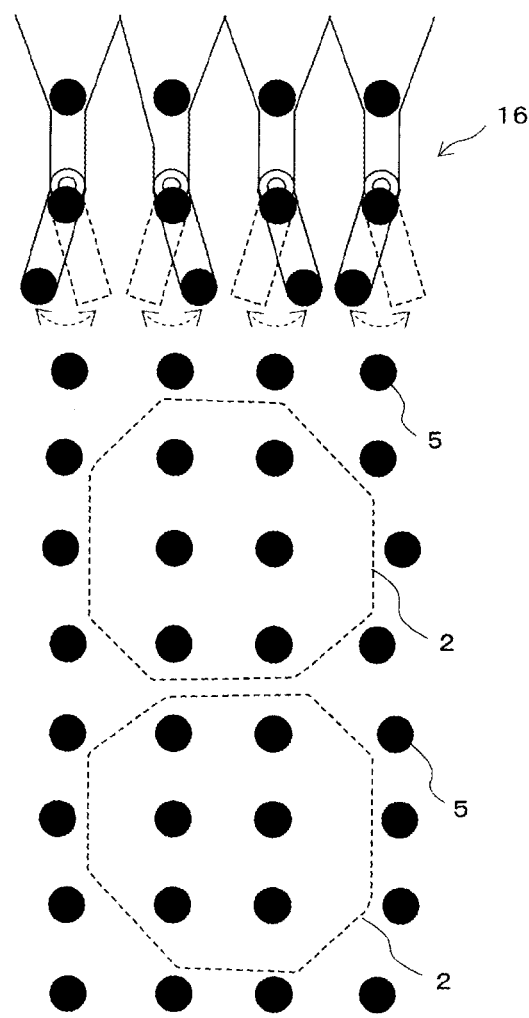
FIG. 7 is a top view showing a conveying state of a workpiece.

According to the guide unit 16 which functions in the way described above, as shown in FIG. 7, the support members 5 which are disposed in a position on to which a laser beam is irradiated are caused to move in the direction which intersects the conveying direction, whereby even in the event that the laser beam passes through work, the support members 5 which support a lower surface of the workpiece are not damaged by the laser beam. In addition, according to the conveyor system of the exemplary embodiment, the support members 5 can be caused to move in the direction which intersects the conveying direction by making use of the driving force of the drive unit 3 for conveying workpiece. Therefore, the conveyor system may be applied to a continuous processing of workpiece. In addition, the degree of freedom in disposition of the support members 5 is very large, thereby making it possible to deal with processing of workpieces which are different in dimension and processing position.

Further, the support members 5 in the conveyor system may be supported so as to fall in the vertical direction. According to this configuration, the degree of freedom in disposition of the support members 5 is increased further, thereby making it possible to increase further the capability to deal with workpieces which are different in dimension and processing position. In addition, the support members 5 may be provided with a magnet or a sucking mechanism employing vacuum or the like at the distal end portions thereof. According to this configuration, plate-like members 2 which are cut out of the sheet steel unwound from the coil 1 can be recovered selectively. In addition, the vibration of the coil can be suppressed, thereby making it possible to increase the processing accuracy.

2. Operation of Conveyor System

An operation of the conveyor system of the exemplary embodiment will be described when it is applied to a laser cutting system. In this conveyor system, as shown in FIG. 1, the two drive wires 7 are wound round the drive pulleys 6 and the driven pulleys 8 in the endless fashion so as to extend therebetween so that the respective upper straight-line portions of the drive wires 7 become parallel to the conveying direction of workpiece. Then, the plurality of holding units 4 are provided at predetermined intervals along the full circumference of the drive wires 7 so as to extend between the two drive wires 7. In these holding units 4, the plurality of support members 5 are provided so as to be disposed at predetermined intervals in the direction which intersects the conveying direction. In this configuration, when the driving force is transmitted to the drive wires 7, the plurality of holding units 4 move circumferentially along the oval tracks of the drive wires 7, whereby the supporting plane of workpiece is formed by the respective distal end portions of the support members 5 at the upper straight-line portions of the drive wires 7.

In the laser cutting system to which the conveyor system of the exemplary embodiment is applied, the coil 1 of long sheet steel is disposed at an upstream side, and the sheet steel material is unwound from the coil 1 and is caused to pass through a leveler 19 so as to be rolled into a flat plate. Thereafter, the sheet steel material which is rolled into the flat plate is then conveyed to a position lying below a laser emitting portion of a laser emitter 20 by the conveyor system. The laser emitting portion of the laser emitter 20 can be moved both in the conveying direction and the direction which intersects the conveying direction and further can cut the workpiece with a laser beam while conveying the workpiece in consideration of the conveying speed of the workpiece.

Here, a position on the surface of the workpiece on to which a laser beam is irradiated can be calculated in advance by a control unit, and therefore, the support members 5 which are disposed in the position on to which the laser beam is irradiated can be caused to move in the direction which intersects the conveying direction by the guide units 16. The movement of the support members 5 in the direction which intersects the conveying direction is carried out by taking some of the support members 5 which are caused to move circumferentially by the drive unit 3 into the guide units 16 from the openings in the guide portions 17, guiding the support members 5 so taken into the guide units 16 as far as the swinging guide portions 18 along the inner surfaces thereof, controlling the angles at the downstream ends of the swinging guide portions 18 and causing the support members 5 to pass through the swinging guide portions 18.

By using the conveyor system of the exemplary embodiment, the support members 5 which are disposed in the position on to which the laser beam is irradiated are caused to move in the direction which intersects the conveying direction. Thus, even in the event that the laser beam passes through the work, the support members 5 which support the lower surface of the workpiece are not damaged by the laser beam, whereby the workpiece can continue to be conveyed while being supported at the lower surface thereof. Thereafter, the plate-like members 2 resulting from the cutting of the workpiece by the laser beam can selectively be recovered by a magnet conveyor 21 disposed at a downstream side of the conveyor system.

According to the embodiments, the conveyor system may include: the plurality of support members 5 which are erected and spaced apart from each other; the plurality of holding units 4 on which the plurality of support members 5 are held; and the drive unit 3 configured to move the holding units 4 in the conveying direction. The supporting plane on which the workpiece is supported and conveyed may be formed by the distal end portions of the support members 5. The support members 5 may be respectively arranged to be movable in parallel with respect to the supporting plane.

The support members 5 may be arranged to be movable in the intersecting direction which intersects said conveying direction, while the distal end portions kept forming the supporting plane.

The holding units 4 may be provided to be movable relative to each other in the conveying direction.

The conveyor system may further includes the guide units 16 extending in the conveying direction and configured to engage with the support members 5. Each of the holding unit 4 may include the slide mechanism 12, 13, 14 on which the support members 5 held by the each of the holding units 4 slide in said intersecting direction. The guide units 16 may be configured to engage with the support members 5 so as to cause the support members 5 to be moved to respective predetermined positions in the each of the holding units 4 in said intersecting direction by the slide mechanism 12, 13, 14 and the drive unit 3.

Each of the holding units 4 may include the gripping mechanism 9 configured to transmit the driving force of the drive unit 3 in the conveying direction to the each of the holding units 4. The position of the each of holding units 4 is selectively changed in the conveying direction by the gripping mechanism 9.

DESCRIPTION OF REFERENCE NUMERALS AND SIGNS 1 coil of sheet steel; 2 plate-like member; 3 drive unit; 4 holding unit; 5 support member; 6 drive pulley; 7 drive wire; 8 driven pulley; 9 gripping mechanism; 10 guide rail; 11 roller bearing; 12 pin flange; 13 shaft plate; 14 guide rail; 15 bearing; 16 guide unit; 17 fixed guide portion; 18 swinging guide portion; 19 leveler; 20 laser emitter; 21 magnet conveyor.

What is claimed is:

1. The conveyor system comprising:
a plurality of support members which are erected and spaced apart from each other;
a plurality of holding units on which the plurality of support members are held;
a drive unit configured to move the holding units in a conveying direction; and
guide units extending in the conveying direction,
wherein a supporting plane on which a workpiece is supported is formed by distal end portions of the support members, and the support members are respectively arranged to be movable in parallel with respect to the supporting plane,
wherein the workpiece is conveyed while being supported on the supporting plane,
wherein the support members are arranged to be movable in an intersecting direction which intersects said conveying direction while the distal end portions keep forming the supporting plane,
wherein the guide units extending in the conveying direction are configured to engage with the support members,
wherein each of the holding units comprises a slide mechanism on which the support members held by the each of the holding units slide in said intersecting direction, and
wherein the guide units are configured to engage with the support members so as to cause the support members to be moved to respective predetermined positions in the each of the holding units in said intersecting direction by the slide mechanism and the drive unit.

2. The conveyor system according to claim 1, wherein the holding units are provided to be movable relative to each other in the conveying direction.

3. The conveyor system according to claim 2, wherein each of the holding units includes a gripping mechanism configured to transmit a driving force of the drive unit in the conveying direction to the each of the holding units, and
wherein a position of the each of holding units is selectively changed in the conveying direction, by the gripping mechanism.

4. A conveyor system comprising:
a plurality of support members which are erected and spaced apart from each other;
a plurality of holding units on which the plurality of support members are held; and
a drive unit configured to move the holding units in a conveying direction,
wherein a supporting plane on which a workpiece is supported is formed by distal end portions of the support members, and the support members are respectively arranged to be movable in parallel with respect to the supporting plane, wherein the workpiece is conveyed while being supported on the supporting plane, wherein the holding units are provided to be movable relative to each other in the conveying direction, wherein each of the holding units includes a gripping mechanism configured to transmit a driving force of the drive unit in the conveying direction to the each of the holding units, and wherein a position of the each of holding units is selectively changed in the conveying direction, by the gripping mechanism.

* * * * *